(12) United States Patent
Mitchell (10) Patent No.: US 9,983,295 B2
(45) Date of Patent: May 29, 2018

(54) DIRECT SAMPLING OF RECEIVED SIGNALS IN RADAR

(71) Applicant: MARK Resources, Inc., Torrance, CA (US)

(72) Inventor: Richard L. Mitchell, Palos Verdes, CA (US)

(73) Assignee: MARK Resources, Inc., Torrance, CA (US)

( * ) Notice: Subject to any disclaimer, the term of this patent is extended or adjusted under 35 U.S.C. 154(b) by 432 days.

(21) Appl. No.: 14/864,426

(22) Filed: Sep. 24, 2015

(65) Prior Publication Data

US 2017/0010345 A1  Jan. 12, 2017

Related U.S. Application Data

(60) Provisional application No. 62/191,153, filed on Jul. 10, 2015, provisional application No. 62/193,315, filed on Jul. 16, 2015.

(51) Int. Cl.
*G01S 7/292* (2006.01)
*G01S 7/35* (2006.01)
(Continued)

(52) U.S. Cl.
CPC .......... *G01S 7/2921* (2013.01); *G01S 7/2923* (2013.01); *G01S 7/352* (2013.01); *G01S 7/354* (2013.01);
(Continued)

(58) Field of Classification Search
CPC ...... G01S 7/2921; G01S 7/2923; G01S 7/352; G01S 7/354; G01S 7/4021; G01S 7/486; G01S 7/487; G01S 7/4876
See application file for complete search history.

(56) References Cited

U.S. PATENT DOCUMENTS 5,140,332 A * 8/1992 Martin ................. G01S 13/282
 342/132
7,876,869 B1 * 1/2011 Gupta .................... H04B 1/109
 375/350

(Continued)

OTHER PUBLICATIONS

Dillon, Tom , "An Efficient Architecture for Ultra Long FFTs in FPGAs and ASICs", HPEC 2004 Abstract Submission, http://www.dtic.mil/dtic/tr/fulltext/u2/a433447.pdf, (2004), 18 pp. total.

(Continued)

*Primary Examiner* — Peter M Bythrow
(74) *Attorney, Agent, or Firm* — Womble Bond Dickinson (US) LLP (57) ABSTRACT

It is common practice in modern radar to utilize some type of downconversion to an intermediate frequency or baseband before analog-to-digital conversion takes place. Several microwave components are needed for this downconversion process, including a tunable local oscillator, bandpass filters, amplifiers, and other signal conditioning devices. The present invention eliminates many microwave components in the radar receiver by sampling the received signal directly, without downconversion or mixing. The manipulation of the received signals that was formerly done with microwave hardware is now done in a digital signal processor. In addition to simplifying the receiver hardware, this invention will also lead to better utilization of the frequency band, less interference from adjacent bands, improvements in system reliability and stability, reduction in system operation and maintenance costs, and will facilitate future system modifications and upgrades.

15 Claims, 4 Drawing Sheets

(51) Int. Cl.
  *G01S 7/40* (2006.01)
  *G01S 7/487* (2006.01)
  *G01S 7/486* (2006.01)

(52) U.S. Cl.
  CPC .............. *G01S 7/4021* (2013.01); *G01S 7/486* (2013.01); *G01S 7/4876* (2013.01)

(56) References Cited

U.S. PATENT DOCUMENTS

| | | | | |
|---|---|---|---|---|
| 7,944,392 B2* | 5/2011 | Falk | ........................ | G01S 7/023 342/104 |
| 8,509,354 B2* | 8/2013 | Fudge | ................ | H04L 27/1566 375/130 |
| 9,835,723 B2* | 12/2017 | Jansen | ................... | G01S 13/931 |
| 2006/0273952 A1* | 12/2006 | Krikorian | ............... | G01S 7/038 342/198 |
| 2007/0247351 A1* | 10/2007 | Falk | ................... | G01S 13/0209 342/109 |
| 2009/0295623 A1* | 12/2009 | Falk | ........................ | G01S 7/023 342/109 |
| 2011/0288823 A1* | 11/2011 | Gupta | ................... | H04B 1/109 702/189 |
| 2016/0033631 A1* | 2/2016 | Searcy | ................. | G01S 7/2806 342/132 |
| 2016/0124086 A1* | 5/2016 | Jansen | ................. | G01S 13/582 342/93 |

OTHER PUBLICATIONS

Mitchell, R. L., "Creating Complex Signal Samples From a Band-Limited Real Signal", *IEEE Transactions on Aerospace and Electronic Systems*, vol. 25, No. 3, (May 1989), pp. 425-427.

Mitchell, R. L., "Prefiltering: Cascaded Stages of Decimation-by-Two" *IEEE Transactions on Aerospace and Electronic Systems*, vol. 25, No. 3, (May 1989), pp. 422-424.

Mitchell, Richard L., "Radar Signal Simulation", Artech House, (1976), pp. 45-50 & 100-107.

Poshala, Purnachandar, "Why Oversample when Undersampling can do the job?", Texas Instruments Application Report SLAA594A, (Jul. 2013), pp. 1-11.

Press, William H., et al., "Numerical Recipes in C: The Art of Scientific Computing, Second Edition", Cambridge University Press, (1998), pp. 496-531.

Rihaczek, August W., "Principles of High-Resolution Radar", McGraw-Hill, (1969), pp. 15-20, 28-34 & 150-157.

* cited by examiner

Fig. 1

Diagram for Direct Sampling of Received Signals

Fig. 2

General Relationship Between Signal and Image Bands

Fig. 3

Band Relationships for Example 1 with Sample rate of 400 Msps

Fig. 4

Lorch Bandpass Filter No. 12EZ4-1100/100-S

Fig. 5

Lorch Bandpass Filter No. 13EZ5-3000/200-S

Fig. 6

Switching Between Subbands

Fig. 7

Partitioning of Wideband Signals into Multiple Subbands

Fig. 8

Processing of Wideband Signals

Fig. 9

Tapering of Subband Edges

DIRECT SAMPLING OF RECEIVED SIGNALS IN RADAR

CROSS-REFERENCE TO RELATED APPLICATIONS

This application claims the benefit of U.S. Provisional Patent Application No. 62/191,153 filed Jul. 10, 2015 and U.S. Provisional Patent Application No. 62/193,315 filed Jul. 16, 2015.

BACKGROUND OF THE INVENTION

1. Field of the Invention

The present invention relates to the field of radar and how signals are processed in the receiver.

2. Prior Art

It is common practice in modern radar to utilize some type of downconversion or mixing of received signals to an intermediate frequency or baseband, where analog-to-digital conversion takes place. Several other microwave components are usually needed for this downconversion process, including a tunable local oscillator, multiple bandpass filters, amplifiers, and other signal conditioning devices.

DETAILED DESCRIPTION OF THE PREFERRED EMBODIMENTS

In the present invention, the received signals are sampled directly without downconversion or mixing. The concept is applicable to radar systems that operate in the lower frequency bands, below about 3.5 GHz based on the state-of-the-art (year 2015) in analog-to-digital conversion devices. However the technology of these devices has been evolving at a rapid rate, so that the limit on the applicable frequency should continue to evolve as well, making the present invention applicable to even higher frequencies.

The present invention eliminates many microwave components in the radar receiver by the sampling of the received signal directly, without downconversion or mixing. The manipulation of the received signals that was formerly done with microwave hardware is now done in a digital signal processor. In addition to simplifying the receiver hardware, this invention will also lead to better utilization of the frequency band, less interference from users in adjacent bands, improvements in system reliability and stability, reduction in system operation and maintenance costs, and will facilitate future system modifications and upgrades. The present invention is aimed primarily at pulsed radar.

Figure 1:
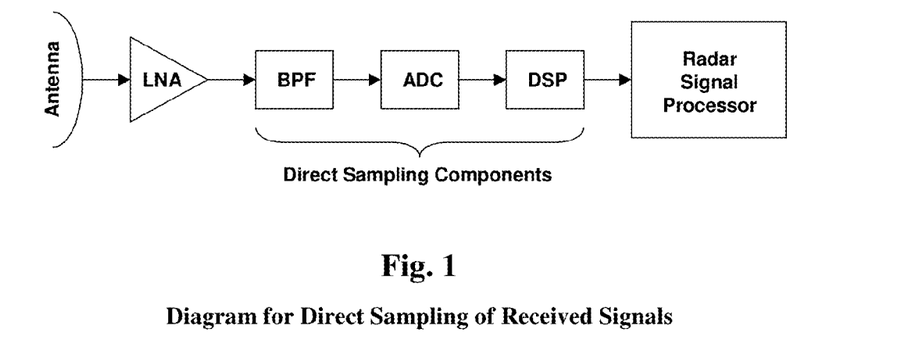
FIG. 1 is a diagram illustrating Direct Sampling of Received Signals in a radar receiver in a radar system.

The preferred embodiment in the present invention is illustrated in FIG. 1, where the low-noise amplifier (LNA) is next to the radar antenna, which is followed by a bandpass filter (BPF) and the analog-to-digital converter (ADC). However it should be noted that alternatively, the bandpass filter may be positioned between the antenna and the LNA. Not shown are some other components such as amplifiers, attenuators, and signal conditioning devices. In that regard, in the description and in the claims to follow, it is to be recognized that any action taken on the result of a prior action is to be understood to include the result of any action of any intermediate components such as amplifiers (possibly including the low noise amplifier LNA), attenuators and signal conditioning devices not specifically described herein.

The digitized output of the ADC for each pulse is fed to a digital signal processor (DSP) where several operations are performed on the signal in preparation for input to the radar signal processor (RSP), where the traditional signal processing, detection, and tracking functions take place. Since multiple receiver channels are frequently used for measuring angle, the components leading up to the radar signal processor in FIG. 1 need to be duplicated in each receiver channel, and the ADCs need to be synchronized.

Implementation of the Concept

Part 1: Signal Sampling

There are several requirements for directly sampling the received signal in radar without utilizing any downconversion or mixing operation where only one ADC is used in each receiver channel: (1) in this embodiment, the bandpass filter that precedes the ADC needs to encompass the entire tunable band of the radar, even though this tunable band will generally be much wider than the band of the actual transmit signal; (2) the sampling rate of the ADC must be at least twice the tunable bandwidth; (3) the ADC needs to accommodate the highest frequency of interest; (4) the bandpass filter must provide an adequate degree of suppression of the aliased image bands, and (5) the ADC clock needs to be synchronized with the radar system master oscillator.

These requirements place constraints on the sample rate. A conservative choice in this rate is given by $$f_s = (4/n)f_c \quad \text{(Eq. 1)}$$

where: $f_c$ as the center of the tunable band and $$n = \text{largest odd integer that does not exceed } f_c/B \quad \text{(Eq. 2)}$$

where: B is the width of the tunable band. In general, the sample rate of the ADC will be less than the highest frequency in the tunable band, making it undersampled according to a common definition. Nevertheless, all information within the passband will be retained as long as the image bands are adequately suppressed. (Undersampling is discussed in detail in "why Oversample when Undersampling can do the Job?", Texas Instruments Application Report SLAA594A by Purnachandar Poshala.)

In this case the separations between the signal band and the neighboring image bands will be the same, and will be at least as wide as the bandwidth B, which will allow the bandpass filter to be designed with a very high degree of image suppression. Other choices to consider are larger odd integers in Eq. 2, which will reduce the sample rate and possibly also the processing load in the DSP. Smaller odd integers in Eq. 2 may also be of interest if the sample rate needs to be coordinated with the parameters of an existing system.

Figure 2:
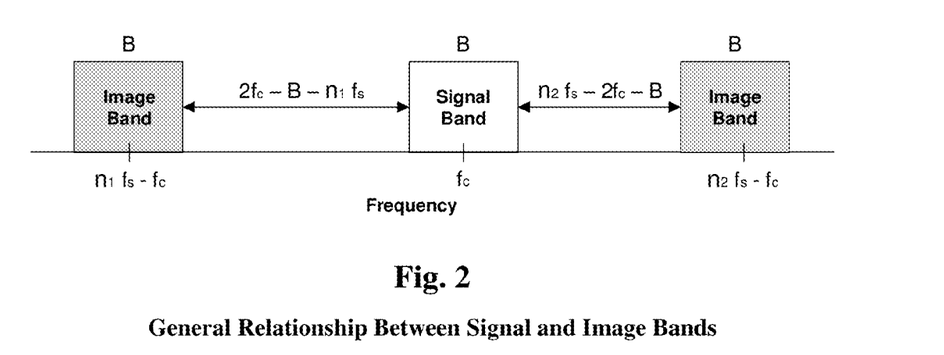
FIG. 2 illustrates the general relationship between signal and image bands.

The resulting sample rates may be incompatible with the rate in an existing radar system, or otherwise inconvenient for the analysis, in which case some adjustments will be in order. Any adjustment will change the separation between the signal band and its neighboring image bands. Let the odd integer n be the sum of two consecutive integers $n_1$ and $n_2$ ($n_1 < n_2$). As shown in FIG. 2, the separation on the low side of the signal band is $$\Delta f_1 = 2f_c - B - n_1 f_s \qquad (\text{Eq. 3})$$

and the separation on the high side is $$\Delta f_2 = n_2 f_s - 2f_c - B \qquad (\text{Eq. 4})$$

Note that $\Delta f_1 + \Delta f_2 = f_s - 2B$.

Without any adjustment, the separations will be the same as $$\Delta f_1 = \Delta f_2 = f_s/2 - B \qquad (\text{Eq. 5})$$

An upward adjustment in Eq. 3 reduces the spacing on the low side of the signal band, while a downward adjustment in Eq. 4 reduces the spacing on the high side. Since analog bandpass filters tend to have a steeper falloff on the high side than the low, a downward adjustment will usually be better.

A larger value of n than Eq. 2 will reduce the sample rate, as well as the processing load in the DSP, but will also place more constraints on the design of the bandpass filter to adequately suppress the images. A practical limit on the separation of the signal and image bands is about 20% of the tunable bandwidth B, depending on the desired level of image suppression. This leads to a lower bound on the sample rate of approximately $$f_s \geq 2.40\ B \qquad (\text{Eq. 6})$$

This procedure works as long as $n \geq 3$. In the limiting case for $n=3$, the combination of Eqs. 1 and 6 results in an approximate upper bound on the tunable bandwidth of $$B \leq 0.56\ f_c \qquad (\text{Eq. 7})$$

If the tunable bandwidth is much greater than this limit, there will be no other option with a single ADC than to set $n=1$ in Eq. 1, so that $f_s = 4\ f_c$. In this case the upper limit on the tunable bandwidth will be about $f_c$, again depending on the design of the bandpass filter to suppress the images.

All bandpass filters distort signals in terms of variations in the gain and group delay across the passband, although this is not an issue with the direct sampling concept described herein because these distortions, as well as those introduced by other microwave components, can be compensated in the DSP as discussed in Part 2 of this disclosure.

EXAMPLE 1

Figure 3:
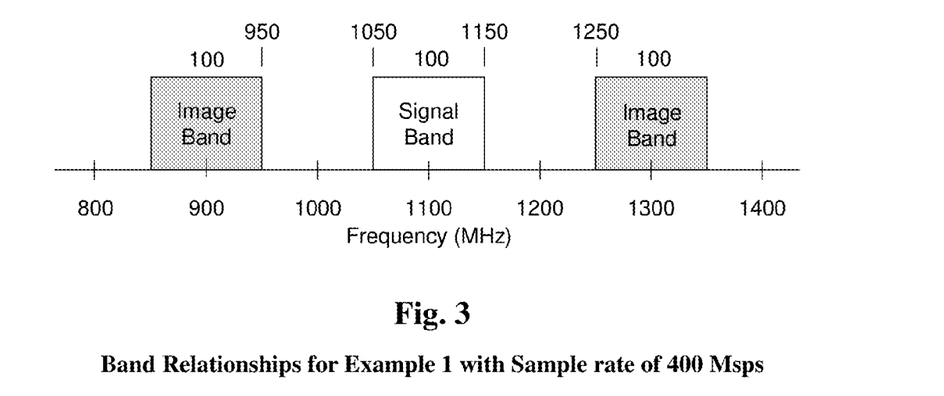
FIG. 3 illustrates the band relationships for Example 1 with Sample rate of 400 Msps.

Suppose the tunable band of the radar is from 1050 to 1150 MHz so that $f_c = 1100$ MHz and $B = 100$ MHz. In this case $n=11$ with the use of Eq. 2 and $f_s = 400$ Msps (million samples per second). This situation is shown in FIG. 3. The tunable band of 100 MHz (white) is centered at 1100 MHz. The real signal has a mirror image band centered at −1100 MHz. After sampling, everything repeats at integer multiples of the sample rate of 400 MHz, which means that two of the aliased image bands will be centered at 900 MHz and 1300 MHz as shown in gray in FIG. 3. The bandpass filter that precedes the ADC needs to suppress these images (as well as all others). Bandpass filters are commercially available that will provide at least 100 dB of suppression of frequencies below 950 MHz and above 1250 MHz.

Table 1 summarizes some other possibilities for the integer n and the sample rate $f_s$. Except for the first entry, some downward adjustments have taken place for convenience, which makes $\Delta f_1$ and $\Delta f_2$ unequal. For the last entry in the table, the separation of the signal band and its image on the high side is only 20 MHz, which is just 20% of the tunable bandwidth. Nevertheless, it is still possible to design a bandpass filter with a respectable level of image suppression, depending on the system requirements.

TABLE 1

Some Parameter Combinations for $f_c$ = 1100 MHz and B = 100 MHz

| Integer (n) | $f_s$ (Msps) | $\Delta f_1$ (MHz) | $\Delta f_2$ (MHz) |
|---|---|---|---|
| 11 | 400 | 100 | 100 |
| 13 | 335 | 90 | 45 |
| 15 | 290 | 70 | 20 |

Figure 4:
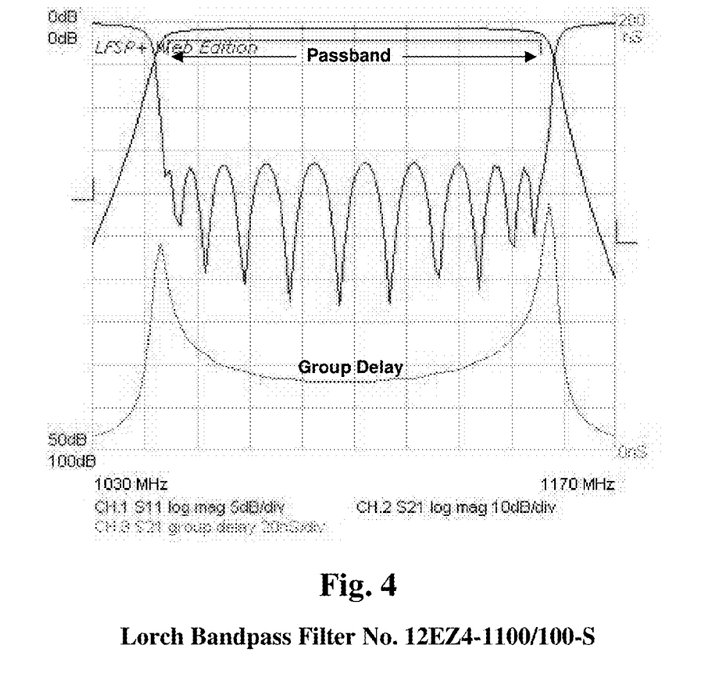
FIG. 4 illustrates Lorch Bandpass Filter No. 12EZ4-1100/100-S as designed for one embodiment of the present invention having a first frequency band.

FIG. 4 shows a bandpass filter designed for the last entry in Table 1. The passband is from 1050 to 1150 MHz, and the separation of the signal band and its image on the high side is just 20 MHz, which is 20% of the width of the tunable band. As shown by the filter response (10 dB per division), the suppression at the right edge of the FIG. 4 (corresponding to the left edge of the upper image band) is almost 60 dB, and it is at least that good at 980 MHz, at the right edge of the lower image band, which is well beyond the left edge of the FIG. 4. (FIGS. 4 and 5 have been produced by the Filter Select Plus online software available at http://fsp.lorch.com/lfsp/main.aspx?ASF=2 (© 2011 Lorch Microwave).)

EXAMPLE 2

As another example, let $f_c = 3000$ MHz and $B = 200$ MHz (which is one of the allocation bands for maritime radar), so that $n=15$ with the use of Eq. 2 and $f_s = 800$ Msps. Because of the fairly low percentage bandwidth, there are several other possibilities for the sample rate, some of which are summarized in Table 2. Except for the first and last entries in the table, the sample rate has been adjusted downward for convenience. For the last entry, the separation of the signal band and its images is only 40 MHz, which is 20% of the tunable bandwidth. Nevertheless, it is again possible to design a bandpass filter with a respectable level of image suppression, depending on the system requirements.

TABLE 2

Some Parameter Combinations for $f_c$ = 3000 MHz and B = 200 MHz

| Integer (n) | $f_s$ (Msps) | $\Delta f_1$ (MHz) | $\Delta f_2$ (MHz) |
|---|---|---|---|
| 15 | 800 | 200 | 200 |
| 17 | 700 | 200 | 100 |
| 19 | 630 | 130 | 100 |
| 21 | 570 | 100 | 70 |
| 23 | 520 | 80 | 40 |
| 25 | 480 | 40 | 40 |

Figure 5:
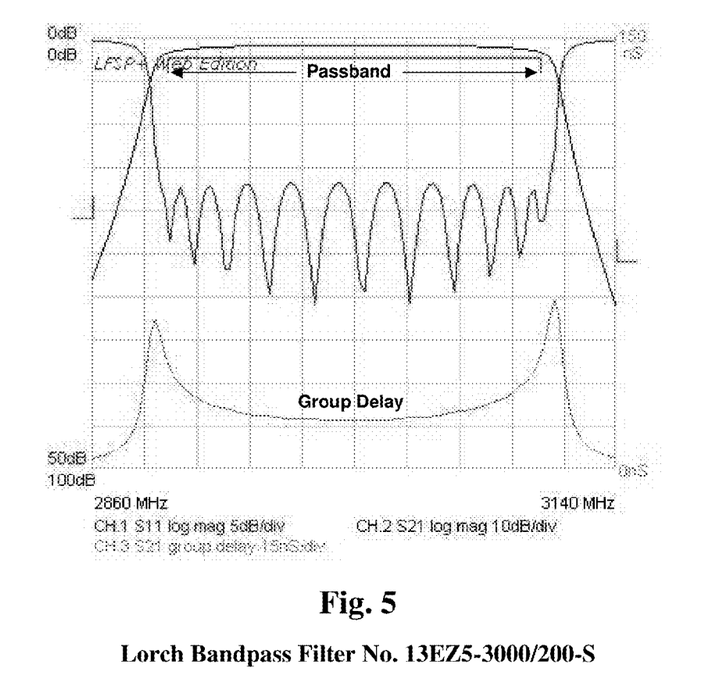
FIG. 5 illustrates a Lorch Bandpass Filter No. 13EZ5-3000/200-S as designed for an embodiment having a second frequency band.

FIG. 5 shows a bandpass filter designed for the last entry in Table 2. The passband is from 2900 to 3100 MHz, and the separation of the signal band and its images is again just 20% of the width of the tunable band. The suppression at the left edge of FIG. 5 (right edge of the lower image band) is about 55 dB. The suppression at the right edge of FIG. 5 (left edge of the image band) is even better.

Partitioning the Tunable Band

Figure 6:
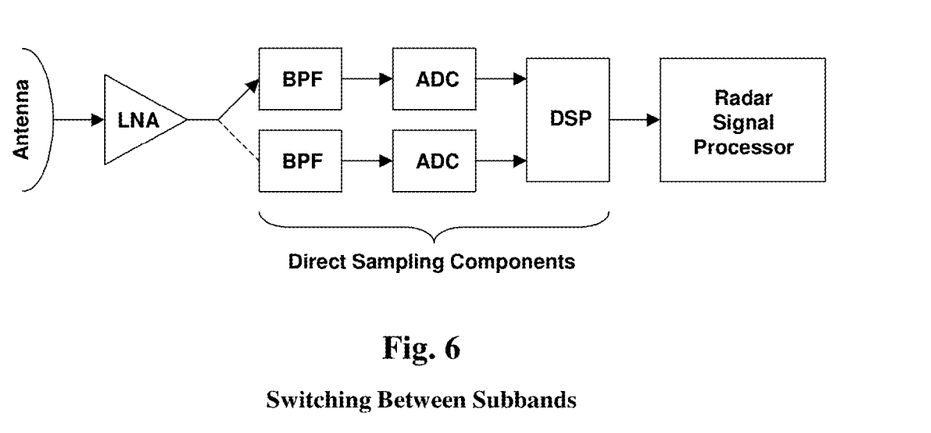
FIG. 6 illustrates switching between subbands.

The preferred embodiment of the present invention is the use of just one ADC in each receiver channel, as shown in FIG. 1. If the tunable band is particularly wide compared to the center frequency, then use of two ADCs is an option to be considered, as shown in FIG. 6. Here the tunable band is divided into two subbands, with separate bandpass filters designed for each subband. The output of the LNA is switched to the appropriate subband depending on the frequency of the transmit pulse. The sampling rates are now determined by the spectral parameters in each subband, which should lead to lower rates into the DSP. The potential advantages of the reduced rate need to be balanced against the increased complexity in microwave hardware. Similar considerations also apply if the tunable band is partitioned into three or more subbands. In any case the subbands need to be overlapped by at least the bandwidth of the transmit pulse.

Wideband Signals

Figure 7:
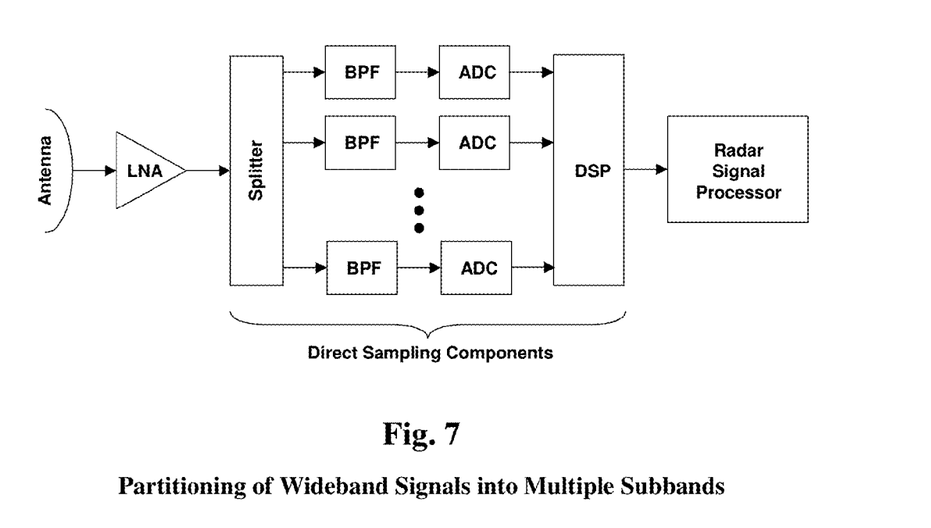
FIG. 7 illustrates partitioning of wideband signals into multiple subbands.

The bandwidth of the transmit pulse may be too large for a single ADC, which is designated herein as a wideband condition. In such cases the entire band can be partitioned into multiple subbands, as shown in FIG. 7, where the sampling rates in the subbands are again determined by the spectral parameters in these bands. All ADC clocks should be derived from the same master oscillator. The partitioning details are best illustrated with an example.

EXAMPLE 3

Table 3 shows how the overall band from 2000 to 4000 MHz can be partitioned into four subbands. The partitioning is on a logarithmic basis and n=9 is used in Eq. 1 for the calculation of the sample rate $f_s$ in each subband. The separation of the subbands and their images is approximately 28% of the width of the subband in each case, which will allow the bandpass filters to be designed with a respectable degree of image suppression, depending on the system requirements.

TABLE 3

Example Where Wideband Signal is Partitioned into Four Subbands

| Subband (MHz) | Width (MHz) | $f_c$ (MHz) | $f_s$ (Msps) |
|---|---|---|---|
| 2000-2378 | 378 | 2189 | 973 |
| 2378-2828 | 450 | 2603 | 1157 |
| 2828-3364 | 536 | 3096 | 1376 |
| 3364-4000 | 636 | 3682 | 1636 |

Part 2: Signal Processing

The digital signal processor (DSP) implements several operations that were formerly performed with analog hardware. The first operation after the ADC is transforming the time-domain samples for each pulse to the frequency domain with a fast Fourier transform (FFT). This forward FFT needs to be long enough to accommodate all ADC samples of interest, which could be the entire interval between pulses (the interpulse period). Suppose, for example, this interval is 800 μs for the parameter combinations in Table 1. For the sample rate of 400 Msps, there will be 320,000 samples to be transformed, which will require an FFT length of $2^{19}$=524,288 (only radix-2 lengths are practical). The real FFT of length N can be implemented in a complex FFT of length N/2 (see Chapter 12 in *Numerical Recipes* by W. H. Press, et al., Cambridge University Press, 1986.) Similarly, for a sample rate of 335 Msps in Table 1 there will be 268,000 samples, which will require an FFT of length of $2^{19}$=524,288. However, for the sample rate of 290 Msps there will be 232,000 samples, which can be accommodated in an FFT length of $2^{18}$=262,144. This sample rate is the best choice because of the shorter FFT.

So far the overall tunable band is being transformed, which is 100 MHz in Example 1 and 200 MHz in Example 2. However, the bandwidth used for any given transmit pulse will usually be much smaller, so the next step is to select the portion of the spectrum that matches the band of the transmit pulse. If this sampling procedure is being retrofitted into an existing system, then a filter in the digital frequency domain needs to be included that approximates the frequency response of the original analog bandpass filter. However, unlike any analog filter, the phase response of this digital filter can be perfectly linear, which will eliminate a source of distortion. It can also be designed to eliminate or reduce distortions introduced by other microwave components in the radar system.

Let $f'_s$ be the sample rate in the existing system. In order to replicate the pulse response for that system, the frequency domain samples within the band of width $f'_s$ need to be transformed back to the time domain. The number of samples in this inverse FFT is given by $$N_2 = N_1(f'_s/f_s) \qquad \text{(Eq. 8)}$$

where $N_1$ is the length of the forward FFT and $f_s$ is the ADC sample rate.

The problem here is that $N_2$ may not be an integer, let alone an efficient number for an FFT. There are three options to consider: (1) reprogram the RSP for a different sample rate $f'_s$ so that $N_2$ is radix-2, or at least mixed-radix with small prime factors, (2) adjust the sample rate $f_s$ to achieve the same result, or (3) use a higher radix-2 number and resample the time-domain signal.

For example, suppose that $f_s$=290 Msps, $N_1$=262,144, and $f'_s$=1.5 Msps, so that the right side of Eq. 8 will be 1355.917. Changing the sample rate in the RSP to 1.493454 Msps will result in $N_2$=1350, which contains prime factors of only 2, 3, and 5. The same result is achieved if $f_s$ is increased to 291.271 Msps, but this rate may be difficult to implement in practice. The third option is to increase $N_2$ to 2048 or 4096 (with zeros filling the extra samples) and resample the time-domain signal. A relatively simple form of interpolation can usually be used, especially with the larger value of $N_2$.

Before the inverse FFT is computed, the variations in amplitude and phase (integrated group delay) across the passband introduced by the analog bandpass filter (as well as other microwave components) can be compensated, based on a calibration exercise.

If this sampling procedure is to be implemented in a new radar system, then one should choose the sample rates so that $N_2$ is a radix-2 number, or at least a mixed-radix number with small prime factors.

The forward FFT in the above examples presents a potential memory problem for the DSP, but there are procedures available to accommodate long FFTs in limited memory that are designed for modern field-programmable gate array (FPGA) devices. (For example, see Dillon, T., "An Efficient Architecture for Ultra Long FFTs in FPGAs and ASICs", HPEC 2004 Abstract Submission, http://www.dtic.mil/dtic/tr/fulltext/u2/a433447.pdf.) Another option is to create the complex signal before the FFT, which will reduce the length of the FFT by the factor of four. (See Mitchell, R. L., "Creating Complex Signal Samples from a Band-Limited Real Signal," *IEEE Trans AES*, May 1989, pp 425-427; the procedure described therein needs to be modified according to the center of the band of the transmit signal.) This can be followed by decimation, which can be done very efficiently as long as the remaining sample rate is much higher than the bandwidth of the signal. (See Mitchell, R. L., "Prefiltering: Cascaded Stages of Decimation-by-Two", *IEEE Trans AES*, May 1989, pp. 422-424.)

Figure 8:
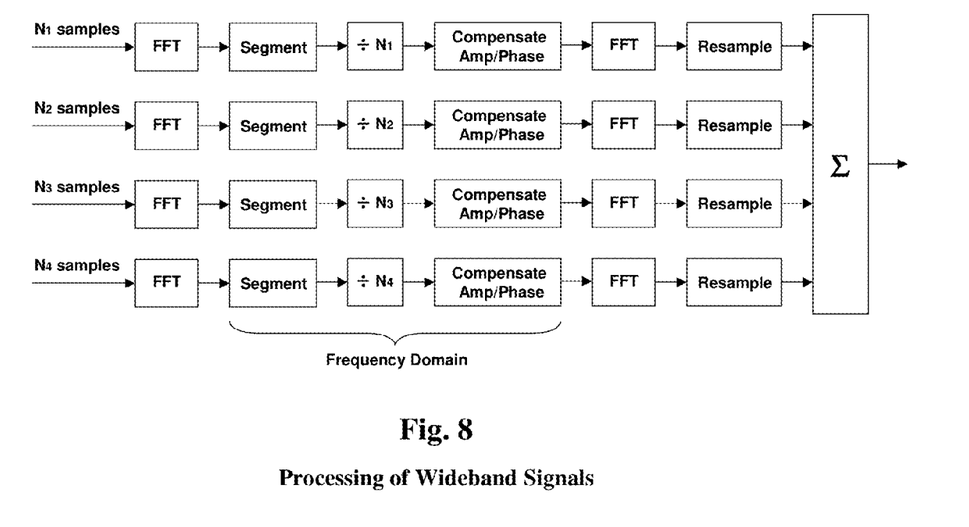
FIG. 8 illustrates processing of wideband signals.

For the wideband radar signals in Example 3, samples in each of the subbands are processed separately, as illustrated in FIG. 8. The length of each forward FFT needs to accommodate data at the eventual sample rate into the RSP, which must be at least the overall bandwidth of 2000 MHz in this example. The spectral samples corresponding to the subband are retained (all other samples are zeroed), the retained samples are normalized by the number of ADC samples in the subband, variations in amplitude and phase across the subband introduced by the bandpass filter (and other microwave components) are compensated, the resulting spectrum is transformed back to the time domain with the same length FFT, and the time domain signal is resampled at a consistent rate. The processed results of the four subbands are then summed for input into the RSP.

Figure 9:
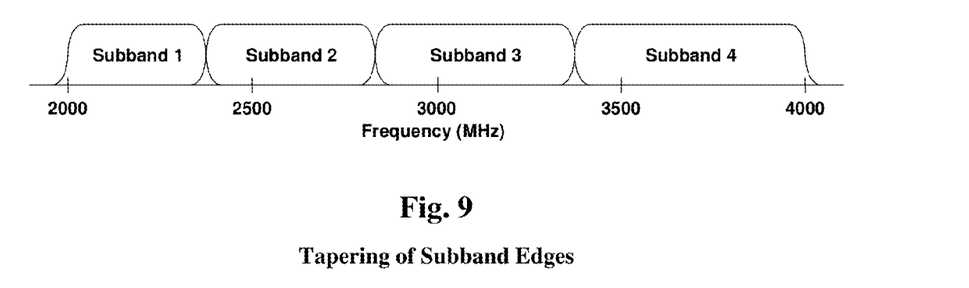
FIG. 9 illustrates tapering of subband edges.

Sharp edges of the subband spectra are undesirable because they contribute high frequency transients. One way to reduce these transients is to extend the subband spectra so that they overlap and then taper their edges as shown in FIG. 9. The tapering function should be chosen so that the sum of the functions is constant within the overlapped portions of the spectra.

Part 3: Pulse Compression

Modern radars usually employ pulse compression to reduce the demand for peak power, where some type of phase or frequency modulation is applied to the pulse. Let $\{x(i)\}$ be samples of the complex function associated with the pulse and $\{y(i)\}$ the received signal samples in complex form. Pulse compression can be implemented in the time-domain as a cross-correlation of $\{x(i)\}$ and $\{y(i)\}$ as $$z(k) = \sum_i y(i) x*(i-k) \qquad (\text{Eq. 9})$$

where the samples $\{z(k)\}$ represent delay, and the asterisk denotes a complex conjugate. (See Mitchell, R. L., *Radar Signal Simulation*, Artech House, 1976, Sections 5.2 and 5.3; also Rihaczek, A. W., *Principles of High-Resolution Radar*, McGraw-Hill, 1969, Sections 2.2, 2.5, and 5.5.)

Pulse compression can also be implemented in the frequency domain with equivalent results. Let X(f) and Y(f) be the Fourier transforms of $\{x(i)\}$ and $\{y(i)\}$, respectively. Then form the product $$Z(f) = Y(f) X*(f) \qquad (\text{Eq. 10})$$

which turns out to be the Fourier transform of $\{z(k)\}$. The product in Eq. 10 is easily integrated with the above signal processing operations prior to the inverse FFT. Amplitude weighting is usually applied to $\{x(i)\}$ to reduce range sidelobes, which can be included in the computation of its spectrum X(f).

This pulse compression procedure can also be applied to the wideband signal where the product in Eq. 10 is implemented in each subband prior to the inverse FFT.

This pulse compression procedure can also be applied to an existing radar system as long as access is available at the appropriate point in the RSP.

The linear-FM waveform is commonly used in radar. Besides being simple to generate with modern digital synthesis devices, an important advantage of this type of modulation is that the spectrum is largely confined to the sweep band, especially for a large time-bandwidth product. This means that relatively little margin will usually be needed in the sample rate relative to the width of the sweep band. (See Mitchell, R. L., *Radar Signal Simulation*, Artech House, 1976, Section 7.8.)

It has been shown that the present invention has a number of aspects, which aspects may be practiced alone or in various combinations or sub-combinations, as desired. While certain preferred embodiments of the present invention have been disclosed and described herein for purposes of illustration and not for purposes of limitation, it will be understood by those skilled in the art that various changes in form and detail may be made therein without departing from the spirit and scope of the invention as defined by the full breadth of the following claims.

What is claimed is:

1. A method for sampling received radar signals directly to be retrofitted into an existing receiver, thereby eliminating a downconversion or mixing process of the existing receiver, comprising:
   a) designing a bandpass filter to accommodate an entire tunable bandwidth of an existing radar system, including choosing a sample rate to facilitate design of the bandpass filter for suppression of aliased image bands;
   b) fabricating the bandpass filter and coupling a received radar signal for each transmitted pulse to the bandpass filter;
   c) sampling, using an analog-to-digital converter, the received radar signal for each transmitted pulse as filtered by the bandpass filter without any downconversion or mixing operations;
   d) transforming the received time-domain samples representing the received radar signal from each transmitted pulse to a frequency domain using a Fast Fourier Transform;
   e) selecting a portion of the frequency domain that matches a frequency band of the transmit pulse;
   f) compensating the selected portion of the frequency domain for distortions in the radar receiver, including distortions introduced by the new bandpass filter;
   g) shaping the selected and compensated portion of the frequency domain to approximate the response of an existing bandpass filter in the radar system being retrofitted;
   h) transforming the selected, compensated and shaped portion of the frequency domain back to the time-domain with an inverse Fast Fourier Transform, the inverse Fast Fourier Transform having a length chosen to include the selected portion of the frequency domain in f);
   i) passing the result of the inverse Fast Fourier Transform to an existing radar signal processor;
   j) repeating b) through i) of the method for all receiver channels in the radar system, each with a respective bandpass filter in accordance with subparagraph b) above, and synchronizing the analog-to-digital converters.

2. The method of claim 1 wherein pulse compression is included before the inverse Fast Fourier Transform of h).

3. The method of claim 1 wherein the new sample rate is chosen to be compatible with the sample rate of the existing radar system so that the inverse Fast Fourier Transform can be radix-2.

4. The method of claim 1 wherein the new sample rate is chosen to be compatible with the sample rate of the existing radar system so that the inverse Fast Fourier Transform can be mixed radix with small prime factors.

5. The method of claim 1 wherein between h) and i), resembling the result of the inverse Fast Fourier Transform, and wherein i) comprises passing the result of the inverse Fast Fourier Transform as resampled to the existing radar signal processor.

6. The method of claim 1 further comprising changing the sample rate in the existing radar signal processor to a rate compatible with the analog-to-digital converter sampling rate.

7. The method of claim 1 further comprising partitioning the tunable bandwidth of the existing radar system into two or more overlapping subbands, where an output of a low noise amplifier in each channel is switched to an appropriate subband depending on the frequency band of the transmit pulse.

8. A method of processing received radar signals to be integrated into a new radar receiver design comprising:
   a) designing a bandpass filter for an entire tunable bandwidth of the radar system, including choosing a sample rate to facilitate design of the bandpass filter for suppression of aliased image bands and so that a length of an inverse Fast Fourier Transform to be used in g) below is a radix-2 number, or at least a mixed-radix number with small prime factors;
   b) fabricating the bandpass filter and applying the received radar signals to the bandpass filter;
   c) sampling, by an analog-to-digital converter, the received radar signals as filtered by the bandpass filter, directly without use of any downconversion or mixing operations;
   d) transforming the received, filtered, sampled and digitized radar signals to a frequency domain with a Fast Fourier Transform to provide a received signal spectrum;
   e) selecting a portion of the received signal spectrum that matches the frequency band of a transmit pulse;
   f) compensating the selected portion of the received signal frequency spectrum for distortions in the radar receiver, including those introduced by the new bandpass filter;
   g) transforming the selected and compensated portion of the received signal spectrum back to a time domain with the inverse Fast Fourier Transform;
   h) passing the result of g) to a radar signal processor;
   i) repeating c) through h) for all receiver channels in the radar system with the analog-to-digital converters synchronized.

9. The method of claim 8 wherein pulse compression is included in the signal processing before the inverse Fast Fourier Transform.

10. The method of claim 8 wherein between g) and h), resampling the result of the inverse Fast Fourier Transform, and wherein h) comprises passing the result of the inverse Fast Fourier Transform as resampled to the radar signal processor.

11. The method of claim 8 further comprising partitioning the entire tunable bandwidth of the new radar system into two or more overlapping subbands, where an output of a low noise amplifier in each channel is switched to an appropriate one of the overlapping subbands depending on the frequency band of the transmit pulse.

12. A method for processing in a radar system, received radar signals where the bandwidth of the transmit pulse exceeds the capability of an analog-to-digital converter comprising:
   a) partitioning the received radar signal band into subbands that are to be processed separately, including choosing a width of each subband and a sample rate to facilitate design of bandpass filters for each subband to suppress aliased images;
   b) fabricating the bandpass filters in each subband in accordance with the design, and bandpass filtering the received radar signals in each subband;
   c) choosing a length of a Fast Fourier Transform for each subband to accommodate data at an eventual sample rate for input into a radar signal processor;
   d) sampling for each subband in a respective analog-to-digital converter, the received radar signals as bandpass filtered, directly without use of any downconversion or mixing operations, wherein clocking of all the analog-to-digital converters with a master oscillator;
   e) transforming the received radar signals associated with each transmitted pulse in each subband as bandpass filtered and as sampled to a frequency domain with Fast Fourier Transforms to provide a spectrum in each subband;
   f) selecting portions of the spectrum in each subband that match the respective bandpass filters and zeroing the spectrum not in the selected portions;
   g) normalizing the spectrum in each subband by the corresponding number of analog-to-digital converter samples;
   h) compensating the normalized spectrum in each subband for distortions introduced by the bandpass filter and other microwave components;
   i) transforming the compensated, normalized spectrum in each subband back to a time domain with inverse Fast Fourier Transforms;
   j) resampling results in i) in each subband at the input sample rate of the radar signal processor;
   k) summing the resampled results in j) and inputting the resampled results to the radar signal processor;
   l) repeating c) through k) for all receiver channels in the radar system.

13. The method of claim 12 wherein pulse compression is included in the signal processing before the inverse Fast Fourier Transforms of i).

14. The method of claim 12 wherein after g), the spectrum in each subband is extended and edges thereof are tapered to avoid high-frequency transients.

15. The method of claim 14 wherein the tapering is performed using tapering functions chosen so that the sum of the functions is constant within overlapped portions of the spectrum of adjacent subbands.

* * * * *